March 5, 1957 W. E. McCOWN ET AL 2,784,119
ULTRASONIC CLEANING OF CURVED SURFACES, AND APPARATUS THEREFOR
Filed Sept. 17, 1953 2 Sheets-Sheet 1

Inventors
William E. McCown and
James W. McAuley
Nobbe & Swope
Attorneys

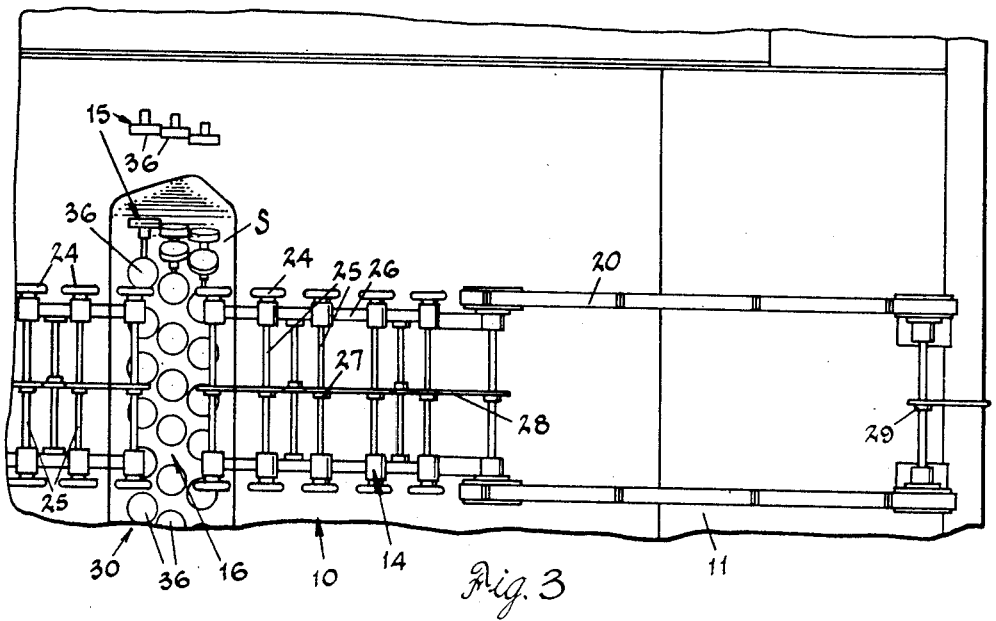
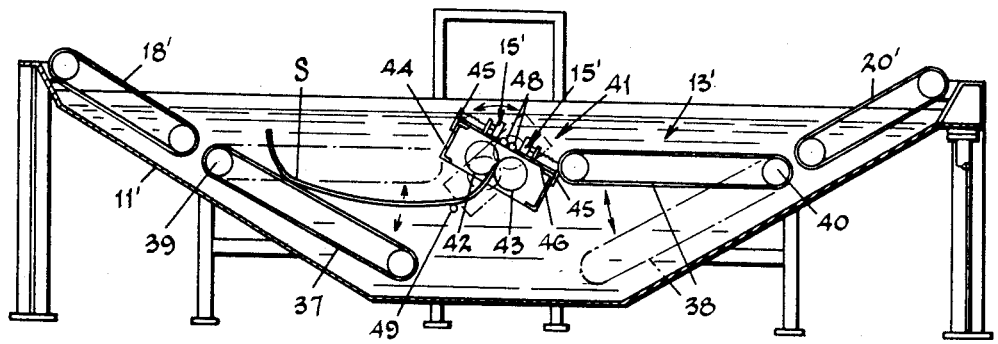
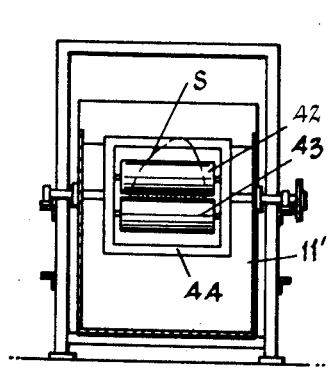
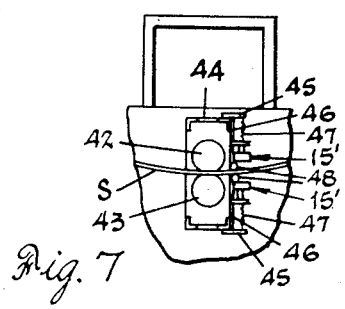

2,784,119

ULTRASONIC CLEANING OF CURVED SURFACES, AND APPARATUS THEREFOR

William E. McCown, Maumee, and James W. McAuley, Perrysburg, Ohio, assignors to Libbey-Owens-Ford Glass Company, Toledo, Ohio, a corporation of Ohio Application September 17, 1953, Serial No. 380,796

8 Claims. (Cl. 134—1)

The present invention relates broadly to washing or cleaning, and more particularly to an improved method and apparatus for washing curved sheets of glass and the like.

Although the invention is not restricted to the washing of any particular article, whether of glass or other material, it is especially well adapted to carry out the difficult cleaning jobs encountered in connection with the production of present day curved laminated safety glass windshields for automobiles, and will be described in that connection here.

In the regular commercial production of such laminated windshields two sheets of bent glass and an interposed layer of tough, non-brittle plastic are first assembled together to provide a glass-plastic sandwich and, after a relatively light preliminary pressure, are finally bonded into an integral composite whole by the action of heat and pressure while immersed in a bath of oil in an autoclave.

Both before assembly, and after laminating, it is important that the curved glass surfaces be thoroughly cleaned and this involves two difficult cleaning operations. In the first one, in addition to normal dust and dirt, if the glass sheets have been bent as a pair, it will also be necessary to remove the parting material from their facing surfaces, and it will be readily appreciated that even one small foreign particle remaining on one of these facing surfaces would be laminated into the unit and might result in the rejection of the finished windshield.

Similarly, after lamination, the outer surfaces of the laminated unit will be covered with a film of oil from the autoclave that must be completely removed.

In the early stages of producing laminated windshields it was a relatively simple matter to remove the oil or other foreign materials from the glass surfaces by conventional washing techniques, because the glass used was either flat or slightly and simply bent. However, with the advent of more and more severely curved designs, culminating in the so-called "hooked," "wrap-around" or "panoramic" windshields, which are now becoming standard in automotive design, the difficulties in adequately washing the glass have become a serious commercial problem; and ordinary washing methods, involving rubbing and scrubbing with brushes and the like, have been found to either give insufficient cleaning, or to materially slow down production, or both.

It is therefore a primary object of this invention to provide a novel method of thoroughly cleaning sharply and complexly curved surfaces in a continuous manner, and one that is ideally adapted for use on a factory production line.

Broadly stated, the invention contemplates the washing of curved surfaces in a more thorough and rapid manner than has heretofore been possible by the use of sonic or ultrasonic vibrations.

The vibration frequencies used are generally between 100 and 30,000 cycles per second and are transmitted in the form of mechanical vibration sound waves, through a suitable medium, for producing energy by means of which work is performed. More particularly, as the sound waves are propagated through the medium, which is preferably a fluid, the motion of the particles of said medium is related to the characteristics of the sound waves. In this manner, the sound waves will create cavitation in a liquid medium; cavitation being the effect of the alternate formation and collapse of gas bubbles or cavities. This collapse of the cavities creates an agitation of sufficient magnitude to actually disintegrate particles of substantially solid material; and it has been found that this vibratory agitation may be used to disintegrate particles of foreign matter from surfaces to be cleaned so that such particles may be easily and readily removed therefrom.

In its more specific aspect, the present invention employs the phenomenon just described to wash curved glass sheets or panoramic windshields by continuously passing such glass articles through a bath of a suitable liquid medium and between generating elements which propagate vibrations within said medium in the ultrasonic range. These generating elements, which may be, for example, magnetostrictive transducers having a suitable output and frequency, are preferably arranged so as to direct the effect of said vibrations onto the glass sheets being moved therebetween along a path substantially normal to the surfaces thereof. In this manner, the effect of said vibrations is maintained at a maximum over all points of said surfaces.

By moving the curved glass sheets continuously between the generating elements, there will be, in effect, a sweeping washing action across both surfaces. Under this procedure, washing proceeds rapidly, and movement of the sheets concurrent with the washing action multiplies the speed of cleaning. Moreover, when the liquid medium, into which said sheets are submerged during washing contains a detergent, the particles of foreign matter disintegrated upon the surfaces of the glass sheets may be even more quickly removed.

Another object of the invention is the provision of an improved apparatus within which glass sheets of various shapes and curvatures can have both surfaces washed simultaneously by means of vibrations in the ultrasonic range propagated to said surfaces through a liquid medium during continuous movement of said sheets through said apparatus.

Further objects and advantages of the invention will become more apparent during the course of the following description when taken in connection with the accompanying drawings.

In the drawings, wherein like numerals are employed to designate like parts throughout the same:

Fig. 3 is a horizontal sectional view of the same apparatus taken substantially along the line 3—3 of Fig. 2;

Fig. 5 is a longitudinal sectional view through another form of apparatus embodying the invention, and in which the glass sheets are moved lengthwise therethrough;

Fig. 6 is a transverse sectional view of the apparatus shown in Fig. 5; and

Fig. 7 is a fragmentary view of a portion of the apparatus of Fig. 5, and showing the curved glass sheet in an advanced position.

Figure 1:
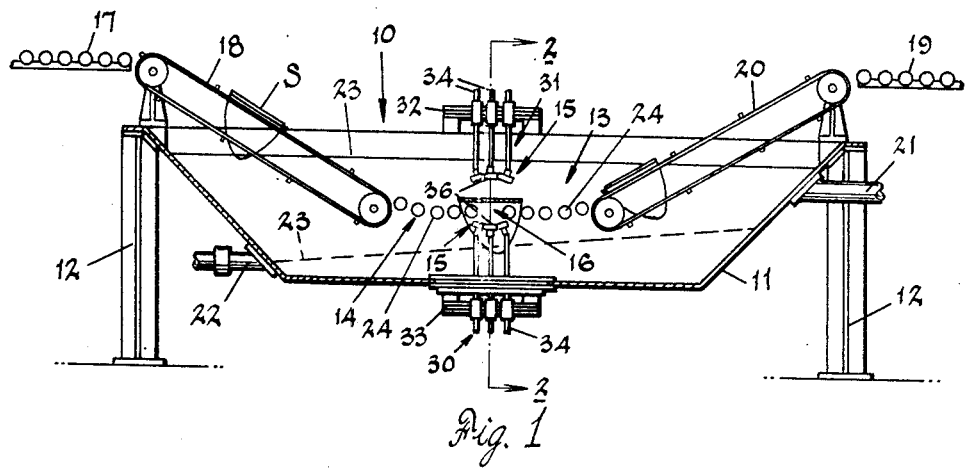
Fig. 1 is a longitudinal sectional view through one form of apparatus embodying the invention and in which curved glass sheets are moved along a path parallel to an axis of curvature thereof during cleaning.
Figure 2:
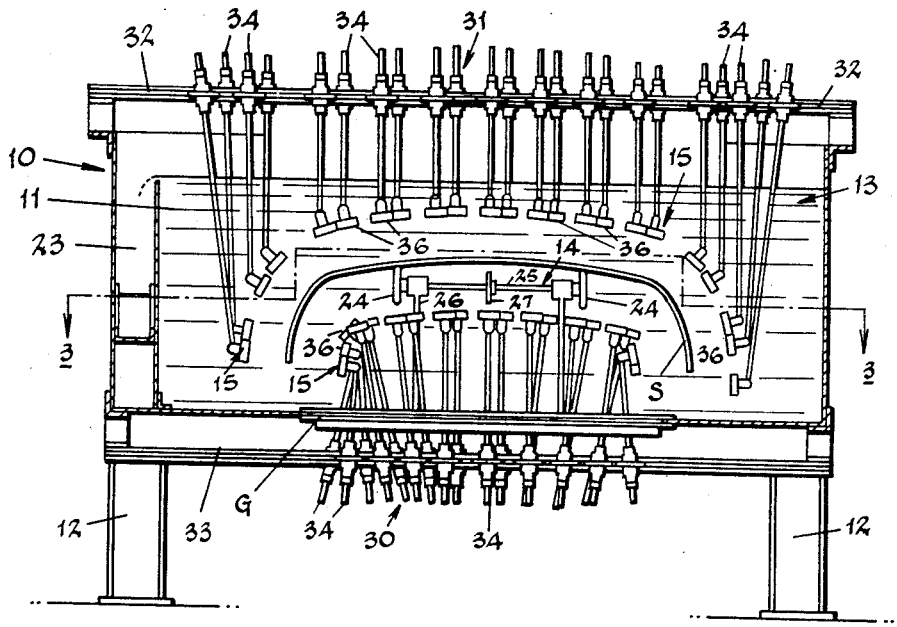
Fig. 2 is a transverse sectional view of the apparatus of Fig. 1 taken substantially along the line 2—2 of Fig. 1.
Figure 4:
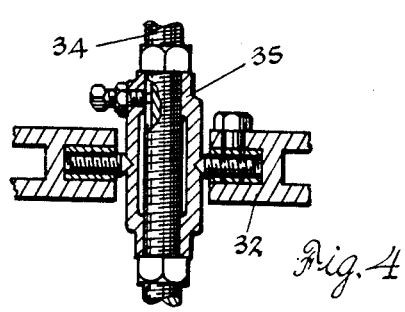
Fig. 4 is a detailed sectional view of the holders for the individual energy generating elements shown in the apparatus of Figs. 1 to 3.

Referring now more particularly to the drawings, there is illustrated in Figs. 1 to 3 one form of apparatus constructed in accordance with this invention, and designated in its entirety by the numeral 10. This apparatus comprises a tank 11, mounted on posts 12, and which contains a bath of water or other suitable liquid medium such as a detergent or acid 13. Midway of the ends of the tank 11, and well below the level of the liquid 13, is a generally horizontally arranged roller conveyor 14 upon which curved glass articles "S" are adapted to be supported and moved, while immersed in the liquid medium 13, for the actual washing operation. The washing treatment is carried out in a manner to be more clearly hereinafter set forth by oppositely disposed vibration generating elements or transducers 15 which are mounted in groups above and below the path of travel of the glass "S," midway between the ends of the conveyor 14 and opposite a gap 16 therein.

Glass sheets to be washed are carried from a feed conveyor 17 downwardly into the liquid 13 and onto the roller conveyor 14 by means of an angled belt conveyor 18 provided with locating or spacer blocks for supporting the glass sheets "S" thereon; and the cleaned glass is carried from the roller conveyor 14 upwardly out of the liquid 13 and onto a discharge conveyor 19 upon a second angled belt conveyor 20 of similar construction.

The tank 11 may have its end walls slanted to conform to the angles of the conveyors 18 and 20 in order to reduce the size of the tank and the volume of liquid required, and a continuous flow of the liquid medium is obtained in a conventional manner by the provision of an inlet pipe 21 and an outlet pipe 22. The inlet pipe 21 is preferably connected to the slanting side on the exit end of the tank so as to keep a clean solution of the liquid medium moving past the cleaned sheets as they emerge from the liquid on the exit conveyor 17. The flow of clean liquid moving past the sheets from the exit toward the entrance end of the tank prevents any foreign material in the main body of the solution from being deposited on the cleaned sheets as they leave the tank. For the same reason, the outlet pipe 22 is connected to the slanting side on the entry end of the tank and may have connected thereto an outlet trough 23 which is formed along a portion of a longitudinal side of the tank to allow any scum or floating material which ordinary would not discharge through the outlet 22 to drain off of the top of the medium.

As beforementioned, the liquid medium covers the conveyor 14 which conveyor is composed of a series of individual rubber rollers 24 mounted on axles 25 which in turn are journaled on support braces 26 attached to the bottom of tank 11. Driving power to each of the axles 25 is supplied by means of sprockets 27 and corresponding sprocket chain 28 (Fig. 3) which is operably connected to each of the sprockets 27 on the axles and also connected to the lower axle of conveyor 20. Conveyor 18 is connected in a similar manner to conveyor 14 by a sprocket and chain arrangement not shown. External driving power is supplied to the conveyors 14, 18, and 20 by means of a sprocket 29 and chain attached to the upper axle of conveyor 20.

As best shown in Fig. 2, the vibration generating elements 15 are arranged in a bottom group 30 which follows and generally parallels the lower concavely curved surface, and a top group 31 which follows and generally parallels the upper convexly curved surface, of the glass sheets "S" as they pass between the two groups. The respective elements as may be seen in Fig. 1 are slightly tilted to focus the vibrations along a relatively narrow path extending across the path of travel, and along the longitudinal dimension, of the sheet so as to cause a higher concentration of energy to sweep or traverse the surface as the sheet passes through the tank along a path parallel to an axis of curvature of the sheet.

For the purpose of supporting the vibration generating elements 15 within the apparatus 10, plates 32 and 33 are mounted above and below the middle of the tank 11 to extend transversely thereof, the former plate being adapted to provide support for the upper group 31 and the latter for the lower group 30. To also permit the individual vibration generating elements or units 15 to be readily located in position for most effective work, and so that the group will follow and substantially conform to the shape of the adjacent glass surface to be cleaned, each element or unit is mounted for pivotal movement at the end of a rod 34. The opposite end of the rod 34 is threaded and passes through an adjustable holder 35 carried by one of the plates 32 or 33. Mounted in the bottom of the tank 11 is a sealing gland "G" which permits the lower group of generating elements 30 to have their mounting rods 34 project to the exterior of the tank for ease of adjustment.

Each of the individual vibrating or energy transmitting units 15 include generating face portions 36, and these are preferably placed in spaced relation with respect to the surface of the sheets "S" with the faces 36 parallel to the adjacent bottom and/or top contours of the sheets as they pass the gap 16 during movement along the roller conveyor 14. This arrangement is important because the energy released from the surface of the face 36 will then travel a path which is substantially normal to the surface of the sheet "S" and so strikes the sheet at right angles. However, the energy waves are not strictly confined to cleaning a surface the exact size of the generating face 36. It has been found that, within limits, the waves tend to diverge slightly and yet will satisfactorily clean an area slightly larger than the face area 36. Thus, as may be seen in Fig. 2, the transmitting units may be spaced apart from each other as it is not essential that the generating surface areas 36 fully equal the area of the surface to be cleaned thereby.

The vibrating or energy transmitting face surfaces 36 may be formed from piezoelectric materials such as quartz or certain ceramic materials which when coupled with particular types of alternating voltages produce very high vibration frequencies. Another type vibration generator that may be used is a magnetostriction transducer consisting of a laminated core of an alloy of ferro-magnetic material such as nickel, iron, and cobalt, which expands and contracts under the influence of a magnetic field. A third type of vibration generator of the mechanical type such as an air hammer or Hartmann whistle using air jets or water jets in the liquid medium to produce ultrasonic vibrations may also be employed in the vibration unit; and consequently the apparatus of the invention is not limited to any one specific form of energy transmitter.

In use, the generating faces 36, which are placed parallel to the portion of the contours of the sheets "S" which they oppose are energized by an alternating voltage causing extremely rapid vibrations to occur on the face surfaces 36. Since the vibrating faces are in direct contact with the liquid medium 13, alternate positive and negative pressure fronts which travel directly from the faces to the sheets along a path normal to the glass surfaces are created. These variable pressure fronts cause a cavitation or bubble effect to take place in the medium 13 which in turn acts upon the molecules of the grease, dirt, or other foreign material on the sheet by first compressing the molecules towards the sheet, and then pulling the molecules towards the vibration generating elements as the bubbles collapse and create a negative pressure area. In this manner, using a detergent medium as an example, as the molecules are subjected to negative pressures, they are spread from one another in minute degrees allowing the liquid medium to seep into the interstices and form a wetting layer between the adjacent molecules. Eventually the detergent action of the liquid medium between the molecules causes the molecules to separate from each other and from the sheet thus leaving the sheet free of foreign matter. These alternate positive and negative pressure fronts may be set up from 100 to 30,000 times per second, resulting in tremendous pressures on the molecular structure of the grease or dirt during a short interval of time. Consequently, the detergent action of the liquid medium on the molecular structure of the deposit material causes the material to become suspended in the liquid in a matter of seconds.

Alternatively, other methods of disturbing the molecular structure on the sheets using similar type vibration generators may be practiced. If the foreign material is such that it is susceptible to crumbling or cracking under repeated fluctuations of pressure, the generators may be used in conjunction with a liquid medium having little if any detergent effect. The liquid medium in this case being used only to transmit the variable pressure wave fronts. On the other hand, if the material to be cleaned can be dissolved by an acid in causing a chemical reaction to take place between the acid and the deposit matter, a medium of this type might also be used in conjunction with the vibration sources to remove the deposit on the sheets. Other types of mediums may also be employed to obtain the cleansing action regardless of their chemical nature e. g. kerosene, sodium silicate as well as liquids containing certain types of abrasive material which cause an eroding action to take place on the foreign matter itself.

Referring now to Figs. 5 to 7, an alternate embodiment of the invention is shown. It will be remembered that in the embodiment already described, the banks of vibration generating elements are arranged above and below the path of travel of the glass sheets through the tank and extend across the path of travel in a pattern which conforms to the contour of the bent sheet. With this set up, the curved sheets to be cleaned are moved in a side-wise direction between and parallel to the faces of the generating elements.

In other words, in this first embodiment the vibrations are caused to follow a path that is substantially normal to the surface being acted upon, and the major surface areas of the sheets are subjected to substantially equal elastic vibrations throughout, by first arranging the banks of energy generating elements to fit the sheet curvature and then moving the sheets between these banks along a path parallel to the axis of that curvature.

With the alternate construction illustrated in Figs. 5 to 7, on the other hand, the sheets are conveyed through the liquid medium 13' in a lengthwise or longitudinal direction, along a path transversely to the axis of curvature of the sheet, and with the curved ends in the leading and trailing positions rather than at opposite sides as in the embodiment shown in Figs. 1 to 4. Nevertheless, the same results of directing the vibrations along a path substantially normal to the portion of the surface being acted upon, and subjecting the curved surfaces to substantially equal elastic vibrations throughout their areas, are also accomplished with this arrangement but by continuously shifting the position of the faces of the generating elements in each bank during movement of the sheet therepast to maintain said faces always parallel with the adjacent portion of the sheet surface upon which they are intended to act.

Thus, in Figs. 5 to 7, entry and exit conveyors 18' and 20' are again used to move the sheets into and out of a tank 11'. However, in this embodiment these conveyors may more properly be called upper entry and exit conveyors because mounted below the conveyors 18' and 20', within the tank, are lower entry and exit conveyors 37 and 38 which are pivotable about their upper pulley axis 39 and 40 and are normally biased to a horizontal position, as shown in Fig. 5.

Upper and lower groups of vibration generating elements 15' adapted to wash the glass sheets as they move through the tank are positioned between the lower entry conveyor 37 and the lower exit conveyor 38 as indicated at 41. In order to insure the vibration generating elements being maintained in proper relation to the glass sheets moving therebetween, there is also provided a pair of rolls 42 and 43 between the conveyors 37 and 38 for transferring the glass sheets from the conveyor 37 to the conveyor 38.

The structure and operation of such transfer rollers is fully described and claimed in connection with the preliminary pressing of laminated safety glass in a copending application of James H. Boicey and Charles H. Cowley, Serial No. 347,462, filed April 8, 1953. However, basically, the transfer roll assembly shown here comprises an outer frame 44 which is oscillatable in the tank 11' between the extreme positions shown in full and broken lines in Fig. 5 about a central axis between and parallel with the two rollers. The rollers 42 and 43 are positioned inside the frame and function to grasp an incoming sheet S therebetween and pass it through both the rollers and the cleaning vibration generating elements 15', which are slidably mounted on the frame 44 adjacent the rollers, during transfer of the sheet from the conveyor 37 to the conveyor 38.

As best shown in Fig. 7, the vibration generators 15' are in fixed spaced relation with respect to each other on slide plate 45 which is slidable in guide way 46 on frame 44. Springs 47 bias the slide plate with the elements thereon so that the space defined between their faces is over the point of contact of the rollers 42 and 43 which allows the sheet "S" emerging from the rollers to enter between the respective vibration elements. To keep the vibration elements substantially equidistant from and parallel to the contour of the sheets passing through the elements, compensating rollers 48 are connected to the slide plate 45. These rollers follow the contour of the sheet and cause the slide plate 45 with the vibrating elements thereon to move back and forth in guide way 46 according to the curvature of the sheet. Thus, the location of the generating elements 15' is dependent upon the curvature of the sheet once the sheet has entered between the compensating rollers 48. At all times then, the elements 19 are maintained substantially equidistant from and parallel to the sheet passing therebetween, and the generated vibrations will therefore travel a path that is substantially normal to the sheet and so attain maximum cleaning efficiency.

In the complete conveying and transfer operation, the conveyors 16' and 17', 37 and 38, and the rollers 42 and 43 are driven in any suitable manner and curved sheets "S" placed on the upper entry conveyor 16, are conveyed downwardly into the liquid medium 13' of the tank 11' and deposited on lower entry conveyor 37 which is normally biased to a horizontal position. After the sheet begins to move on conveyor 37, the weight of the sheets gradually causes the conveyor to dip downwardly. The sheet with its leading and trailing curved ends then travels forwardly and downwardly until its leading or forward curved end begins to make sliding contact on guide roller 49 which supports the leading edge of the sheet until this edge makes contact between the transfer rollers 42 and 43 of the frame 44. As the sheet is grasped by the rollers 42 and 43 and is drawn therethrough, the leading curved end passing through the rollers causes the trailing end to pivot counterclockwise thus forcing conveyor 37 to its extreme lower position shown in Fig. 5. To compensate for the counterclockwise pivotal movement of the trailing end of the sheet, the frame 44 containing the rollers 42 and 43 then begins to revolve in a clockwise direction to bring the trailing edge of the sheet "S" off the lower conveyor 37. It is to be noted in Fig. 5 that if the frame did not pivot in a clockwise direction, the curvature of the leading edge as it passed through the rollers would cause the trailing edge of the sheet to revolve to such an extreme counterclockwise position that it would force the conveyor 37 to its extreme lower position and consequently break or crack the sheet when the conveyor reached the limit of its pivotal travel. Now, it is seen that as the sheet begins its travel through the rollers 42 and 43 of the frame 44, the frame pivots clockwise to lift the trailing edge of the sheet "S" from conveyor 37.

As the sheet passes through the transfer rollers 42 and 43 and the frame 44 pivots clockwise, the leading end of the sheet makes sliding contact with the lower exit conveyor 38 and gradually causes it to pivot downwardly as shown in broken line position of Fig. 5. At the point of release of the sheet "S" from the frame 44, the trailing end slides onto the moving conveyor 38 and the sheet is then moved upwardly to exit conveyor 20' from whence it is moved out of the tank. After having released the sheet in the dotted line position of Fig. 5, the frame 44 is then pivoted in a counterclockwise direction to its original position so that it may receive the next oncoming sheet.

While in the embodiment of Figs. 5 to 7 only the end views of the vibration generating elements 15" are shown on the frame 44, it is to be understood that banks of the units extend in a substantially straight line across the width of the transfer rollers so that the entire width of the sheet is subjected to the cleansing action set up by the generators. And, as the contour of the sheet changes, the position of the vibration elements on the guide way changes by means of the compensating rollers 48 so that the elements will at all times be equidistant from the curvature of the sheet.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. In a device for cleansing foreign matter from continuously moving curved sheets of material the combination of a tank having an energy transmitting medium therein, means to move said sheets through said medium past a plurality of vibration directing elements in said medium for applying vibrations to said sheets at the rate of at least 100 cycles per second, means mounting said vibration directing elements for movement relative to the path of travel of the sheet and maintaining the same substantially parallel to the adjacent surface of said sheet during movement of the sheets past the said vibration directing elements.

2. Apparatus as described in claim 1 wherein the vibration directing elements are mounted on an oscillatable means past which the sheets are moved to be cleaned.

3. The apparatus as described in claim 2 wherein the vibration generating elements are mounted for movement toward and away from the path of travel of the sheets and means are also provided for continuously urging said elements toward said path and for limiting the closeness of their approach thereto.

4. Apparatus for cleansing continuously moving bent sheets comprising a tank having an energy transmitting medium therein, means for moving the sheets along a path parallel to the axis of curvature of the sheets, lower vibration elements arranged below the path of travel of the sheets and positioned to generally follow the lower curvature of the sheets, upper vibration elements positioned above the path of travel of the sheets and arranged to generally follow the upper curvature of the sheets, said vibration elements being capable of applying vibrations to said sheets at the rate of at least 100 cycles per second, and means mounting the generating elements for universal movement relative to said path.

5. Apparatus for cleaning curved surfaces comprising a tank, a bath of energy transmitting liquid in said tank and through which the surface to be cleaned is adapted to be passed along a path substantially parallel with an axis of the curvature of said surface, a plurality of vibration generating elements for applying vibrations to said surfaces at the rate of at least 100 cycles per second extending across said path but spaced therefrom and arranged to follow the curvature of said surface while on said path, and means for conveying the surface along said path and past said elements.

6. A method of cleaning curved glass sheets while said sheets are in a bath of vibration transmitting fluid and positioned between opposed banks of energy directing faces also located within said bath, comprising creating relative movement between said glass sheets and said banks of energy directing faces to cause said banks to completely traverse the major surface areas of said bent sheets while maintaining all of said faces substantially equidistant from a major surface of said sheet and each of said faces substantially parallel with the portion of the sheet area being traversed thereby, and causing said energy directing faces to impart vibration energy at the rate of at least 100 cycles per second to said fluid.

7. A method of cleaning curved sheets which comprises passing said sheets through a bath of vibration conducting fluid along a path extending transversely of an axis of curvature of said sheet and between banks of energy generating faces extending transversely of the path of travel of said sheets, shifting the position of said elements during passage of the sheets to maintain all of said faces substantially parallel to portion of the surface area passing thereby and substantially equidistant from a major surface of said sheets, and impressing and alternating voltage to said energy generating faces to impart vibration energy at the rate of at least 100 cycles per second to said fluid to clean said sheets.

8. Apparatus for treating sheets, comprising a tank having an energy transmitting medium therein, means in said medium for directing vibration energy to both sides of said sheets, said vibration directing means being positioned to generally follow the contour of said sheets and being capable of directing vibrations toward said sheets at the rate of at least 100 cycles per second, and means for moving the vibration directing means and the sheets relative to one another such that the directing means are spaced from the contour of said sheets to cause said vibration energy to traverse the surfaces of said sheets.

References Cited in the file of this patent
UNITED STATES PATENTS

| | | |
|---|---|---|
| 2,484,014 | Peterson | Oct. 11, 1949 |
| 2,554,701 | Hackett | May 29, 1951 |
| 2,609,826 | Marvin | Sept. 9, 1952 |